(12) United States Patent
Do et al.

(10) Patent No.: US 8,938,143 B2
(45) Date of Patent: Jan. 20, 2015

(54) BRANCHING DEVICE FOR HYBRID FAN-OUT CABLE

(71) Applicant: SEHF-Korea Co., Ltd., Gyeongsangbuk-do (KR)

(72) Inventors: Mun-Hyun Do, Daegu (KR); Ho-Soon Lee, Daegu (KR); Jin-Soo Ahn, Seoul (KR); Won-Jung Bae, Gyeongsangnam-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 149 days.

(21) Appl. No.: 13/669,675

(22) Filed: Nov. 6, 2012

(65) Prior Publication Data
US 2013/0170801 A1  Jul. 4, 2013

(30) Foreign Application Priority Data
Jan. 3, 2012 (KR) .................. 10-2012-0000334

(51) Int. Cl.
*G02B 6/44* (2006.01)
(52) U.S. Cl.
USPC ........... 385/101; 385/100; 385/102; 385/103; 385/104; 385/105

(58) Field of Classification Search
CPC .. G02B 6/4416; G02B 6/3817; G02B 6/4494; G02B 6/4433; G02B 6/44
USPC .................. 385/100, 101, 102, 103, 104, 105
See application file for complete search history.

(56) References Cited

U.S. PATENT DOCUMENTS 7,333,706 B2 * 2/2008 Parikh et al. .................. 385/135

FOREIGN PATENT DOCUMENTS

| JP | 2003-066263 A | 3/2003 |
|---|---|---|
| KR | 10-1999-0047089 A | 7/1999 |
| KR | 20-2011-0004827 U | 5/2011 |

* cited by examiner

*Primary Examiner* — Jennifer Doan
(74) *Attorney, Agent, or Firm* — Cha & Reiter, LLC

(57) ABSTRACT

A branching device for enclosing a hybrid fan-out cable the hybrid fan-out cable comprising plural optical cables and power cables, the branching device includes: an enclosure having a first end, through which the hybrid fan-out cable is inserted, and a second end that is opened; and a gasket provided at the second end of the enclosure and having plural through-holes; and a cover thread-coupled to the second end of the enclosure to fasten the gasket to the second end of the enclosure in such a manner that the through-holes are exposed. In the enclosure, the hybrid fan-out cable is branched out into plural individual sub-part cable components, and each of the sub-part cable components is drawn out through one of the through-holes of the gasket to the outside. The gasket is formed from an elastic material which forms a tight seal between the inner peripheral surface of the enclosure and with the outer peripheral surface of each of the sub-part cable components to seal the other end of the enclosure.

20 Claims, 5 Drawing Sheets

BRANCHING DEVICE FOR HYBRID FAN-OUT CABLE

CLAIM OF PRIORITY

This application claims the priority under 35 U.S.C. §119 (a) from an application entitled "Branching Device For Hybrid Fan-Out Cable" filed in the Korean Industrial Property Office on Jan. 3, 2012 and assigned Serial No. 10-2012-0000334, the contents of which are hereby incorporated by reference in its entirety.

BACKGROUND OF THE INVENTION

1. Field of the Invention

The present invention relates to a branching device for a hybrid fan-out cable.

2. Description of the Related Art

In general, an optical cable formed from a plurality of optical fibers is used for transmitting optical signals to a position that is remotely located at a long distance. Recently, lines are configured using such a hybrid fan-out cable to transmit electric power as well as optical signals, in which the hybrid fan-out cable is configured by combining at least one power cable formed from a plurality of copper wires with at least one optical cable formed from a plurality of optical fibers. Such a hybrid fan-out cable may be employed for providing a communication line and a power line to a power supply facility within an optical connection enclosure that receives at least one optical cable and at least one power cable in unison, or to a communication facility of a block of flats, such as an apartment house, or a large building.

Because a communication line and a power line are typically installed along the routes that are substantially coincident to each other, although the lines are formed separately from each other, it is possible to further simplify the configuration of an aerial line or an underground line if such a hybrid fan-out cable is installed. In particular, because not only an optical cable formed from plural optical fibers but also a power cable is essentially required in building a high-speed, large-capacity communication network, a hybrid fan-out cable having at least one optical cable and at least one power cable in combination can be usefully utilized for simplifying the construction of a line.

When building a communication network or a power grid using such a hybrid fan-out cable, at least one optical cable/power cable or at least one sub-hybrid fan-out cable is branched out from the hybrid fan-out cable as needed. At this time, when such a hybrid fan-out cable is wired through a power pole, there is a strong likelihood that at least one branched-out part of the hybrid fan-out cable is exposed to an outdoor environment. Accordingly, the branched-out part of the hybrid fan-out cable is in danger of being corroded or damaged by external environments, such as dust, excrement of birds or bad weather. In addition, in an aerial line, a force to branch out one or more optical cables and power cables from such a hybrid fan-out cable is continuously exerted onto the sheath of the hybrid fan-out cable at the branched-out part due to the weight of the optical cables and power cables themselves.

Although a heat shrinkable tube or a water-proof tape has been used for protecting such a branched-out part in the past, there is a problem in that the heat shrinkable tube or water-proof tube may be damaged due to the deterioration thereof according to the fluctuation of temperature, the exposure to sunlight, precipitation, moisture or the like. Furthermore, even if a protection treatment is implemented using such a heat shrinkable tube or water-proof tape, it is unavoidable that the branched-out part can be fractured if dust or water permeates into the heat shrinkable tube or water-proof tape and is frozen.

In order to protect a branched-out part, a gland-type mechanical member or bonding tube may be occasionally used, and a resin, such as silicon or epoxy, may be introduced into the mechanical member or bonding tube around the branched part to seal the branched part. However, when such gland-type mechanical members are used, there are problems in that it is necessary to fabricate a plurality of the mechanical members or to adjust the number of the mechanical members depending on the number of branched-out cables, and it is necessary to use additional sealing members, such as O-rings, and parts to anchor the mechanical members. When a bonding tube is used, there are problems in that it is impossible to secure complete sealing over the entirety of the bonding tube, and a considerable length of time is required for shrinking the bonding tube itself. In addition, if a resin, such as silicon or epoxy, is introduced in order to enhance the sealing effect, it is inevitable that the weight of the branched-out part is increased, and a considerable length of time is required for curing the resin.

SUMMARY OF THE INVENTION

Accordingly, an exemplary aspect of the present invention is to solve at least some of the above-mentioned problems occurring in the prior art, and to provide a device adapted to be used to branch out a hybrid fan-out cable, which is capable of being used in an indoor/outdoor environment, and to protect the branched-out point.

Another exemplary aspect of the present invention is to provide a branching device which allows branching of an optical cable or a hybrid fan-out cable to be easily implemented.

Also, another exemplary aspect of the present invention is to provide a branching device which can prevent a branched-out part from being damaged by blocking the penetration of dust and water into the branched-out part from the outside.

In accordance with an aspect of the present invention, there is provided a branching device for a hybrid fan-out cable including plural optical cables and power cables, wherein the branching device preferably includes: an enclosure having one end, through which the hybrid fan-out cable is inserted, and the other end that is opened; a gasket provided at the other end of the enclosure and having plural through-holes; and a cover thread-coupled to the other end of the enclosure to fasten the gasket to the other end of the enclosure in such a manner that the through-holes are exposed, wherein in the enclosure, the hybrid fan-out cable is branched out into plural individual optical cables/power cables, or into plural sub-hybrid fan-out cables, each of which has at least one of the optical cables and at least one of the power cables in combination, and each of the cables branched out from the hybrid fan-out cable is drawn out through one of the through-holes of the gasket to the outside, and wherein the gasket is formed from an elastic material to come into tight contact with the inner peripheral surface of the enclosure as well as with the outer peripheral surface of each of the branched-out cables to seal the other end of the enclosure.

BRIEF DESCRIPTION OF THE DRAWINGS

The above and other exemplary aspects, features and advantages of certain exemplary embodiments of the BRANCHING DEVICE FOR HYBRID FAN-OUT CABLE according to the present invention will become more apparent to a person of ordinary skill in the art from the following detailed description taken in conjunction with the accompanying drawings, in which.

DETAILED DESCRIPTION

Figure 1:
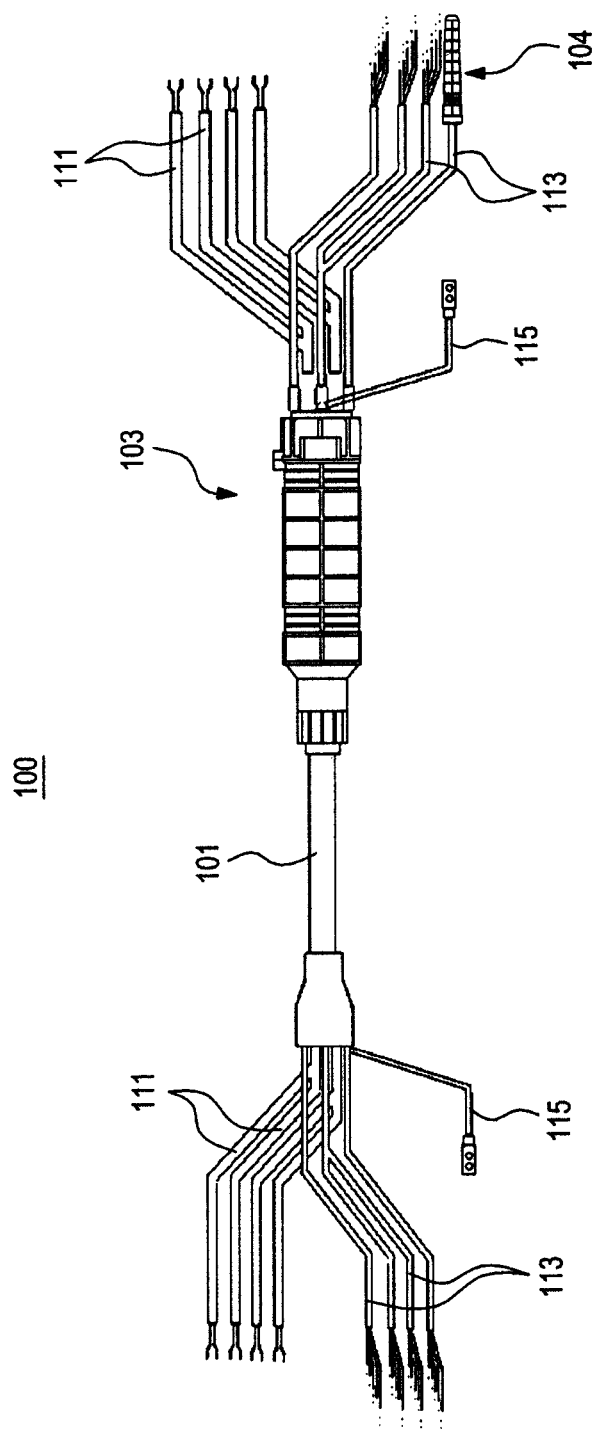
FIG. 1 is a schematic view showing a branching structure of a hybrid fan-out cable having an enclosure in accordance with an exemplary embodiment of the present invention.
Figure 2:
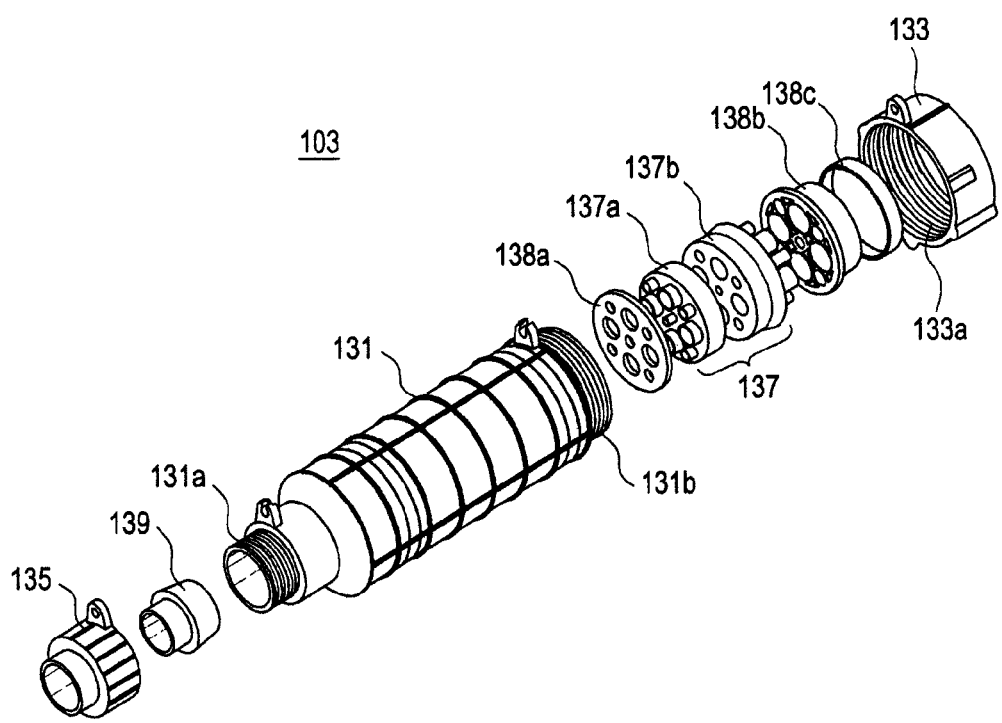
FIG. 2 is an exploded perspective view of the branching device shown in FIG. 1.
Figure 3:
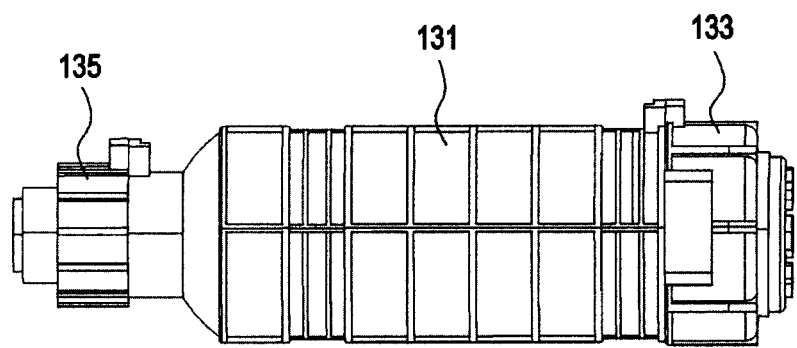
FIG. 3 is a side view of the enclosure shown in FIG. 2 in the assembled state.
Figure 4:
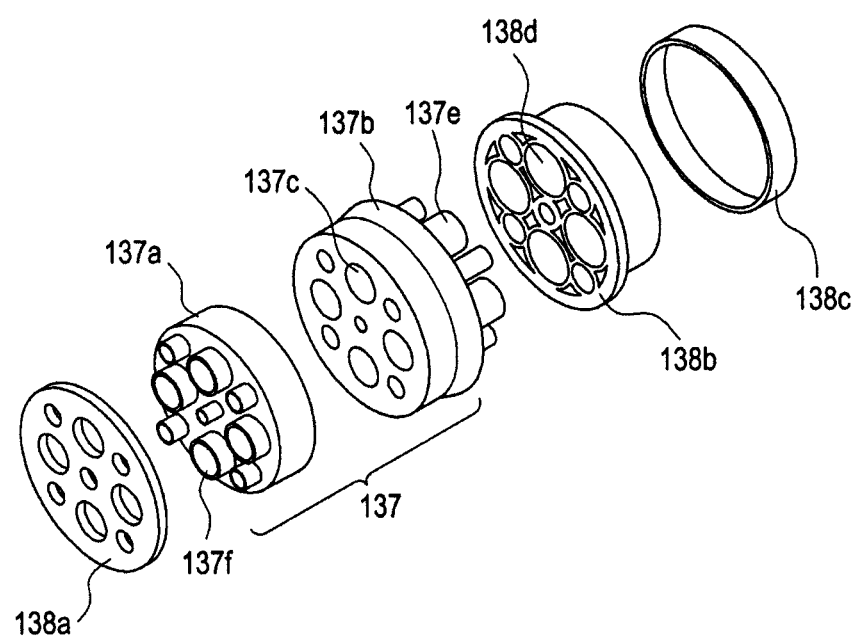
FIG. 4 is a perspective view showing some parts of the branching device shown in FIG. 1 in an enlarged scale.

Hereinafter, exemplary embodiments of the present invention will now be described with reference to the accompanying drawings. In the following description, well-known functions or constructions may not be described in detail when they would obscure appreciation of the present invention by a person of ordinary skill in the art with unnecessary detail of the well-known functions and structures. Also, the terms used herein are defined according to the functions of the present invention as would be understood by a person of ordinary skill in the art. Thus, the terms may vary depending on user's or operator's intension and usage. That is, the terms used herein must be understood based on the descriptions made herein in view of the ordinary level of skill in the art. FIG. 1 shows a wiring structure 100 of a hybrid fan-out cable 101 having a branching device in accordance with an embodiment of the present invention. As shown in FIG. 1, the wiring structure 100 is protected at a branched-out part of the hybrid fan-out cable 101 by using a branch enclosure 103, which includes an enclosure and a cover, and is branched out into at least one optical cable 113/power cable 111 or into at least one sub-hybrid fan-out cable, the sub-hybrid fan-out cable having some of optical fibers and at least one power cable of the hybrid fan-out cable 101 in combination. Among the branched-out cables, a cable, which is connected to a counterpart line, may be protected at the termination end thereof by a separate termination enclosure 104.

Although a hybrid fan-out cable formed by plural optical cables and power cables is exemplified in describing the present invention, it shall be noted that the inventive branching device can also be used in a communication network line which is formed only by one or more optical cables. In addition, as shown in FIG. 1, the hybrid fan-out cable 101 may be provided with at least one ground cable 115 in addition to the optical cables 113 and the power cables 111, and the number of the optical cables or power cables of the hybrid fan-out cable 101 can be variously changed. In addition, when branching of the hybrid fan-out cable 101 is conducted, the hybrid fan-out cable may be branched out into one or more optical cables and power cables, but may also be branched out into one or more sub-hybrid fan-out cables, wherein some optical fibers and at least one power cable are combined in each of the sub-hybrid fan-out cables, as described above. Furthermore, it will be appreciated by a person ordinarily skilled in the art that each of the power cables 111 may be used not only as a cable for supplying power but also as a communication line.

Referring to FIGS. 2 to 6, the branch enclosure 103 adapted to protect a branched-out part of the hybrid fan-out cable 101 includes the enclosure 131 and the cover 133 to protect at least one branched-out part of the hybrid fan-out cable 101, and a gasket 137 is interposed between the enclosure 131 and the cover 133 to provide a sealing function to prevent the inflow of dust or water, thereby protecting the branched-out portion of the hybrid fan-out cable 101. Moreover, a bushing 139 may be provided between one end of the enclosure 131, through which the hybrid fan-out cable 101 is inserted, and the cap 135 to prevent the inflow of dust and water.

The enclosure 131 has a cylindrical shape with opened opposite ends, in which one end of the enclosure 131 is formed as an insertion opening, into which the hybrid fan-out cable 101 is inserted prior to being branched out, and the other end is formed as a simple opened end. The enclosure 131 has threads 131a and 131b formed on the outer peripheral surfaces of the opposite ends to provide a means to be engaged with the cover 133 and the cap 135. Meanwhile, the insertion opening takes a form of being provided in a tube 137 extending by a predetermined length to wrap the outer peripheral surface of the hybrid fan-out cable 101 by the predetermined length. As the hybrid fan-out cable 101 is inserted into the enclosure 131 through the insertion opening, the enclosure 131 is positioned on the hybrid fan-out cable 101.

The interior of the enclosure 131 is formed as an empty space, and the hybrid fan-out cable 101 is branched out in the state in which the enclosure 131 is positioned on the hybrid fan-out cable 101. After the hybrid fan-out cable 101 is branched out, i.e. after the outermost sheath is removed, the enclosure 131 is positioned at the branched-out part of the hybrid fan-out cable 101. That is, the end portion of the un-removed sheath of the hybrid fan-out cable 101 is positioned within the enclosure 131.

The cover 133 is coupled to the other end of the enclosure 131 to seal the enclosure 131. On a part of the inner peripheral surface of the cover 133, there are formed threads 133a which correspond to any of threads 131a and 131b formed on the enclosure 131. Meanwhile, the other end of the enclosure 131 is substantially sealed by the gasket 137, and the cover 133 serves to fasten the gasket 137 to the enclosure 131.

The gasket 137 includes an inner gasket part 137a completely received in the enclosure 131, and an outer gasket part 137b partially received in the enclosure 131 and positioned opposite to the inner gasket 137a. The gasket 137 includes plural through-holes 137c, which are completely formed by aligning and interconnecting the through-holes formed through the inner gasket part 137a and the through-holes formed through the outer gasket part 137b, respectively. In this connection, in order to align the through-holes formed through the inner gasket part 137a and the through-holes formed the outer gasket part 137b, the inner gasket part 137a and the outer gasket part 137b may be provided with plural holes (not shown) and protrusions (not shown) on the opposite faces thereof. That is, by making the holes and protrusions engage with each other, the inner gasket part 137a and the outer gasket part 137b are aligned with each other to completely form the through-holes 137c.

As described above, the inner gasket part 137a is completely received in the other end of the enclosure 131. At this time, a pressure plate 138a is received in the enclosure 131 in such a manner that the pressure plate 138a can support the inner gasket part 137a. That is, a step portion is formed within the other end of the enclosure 131 so as to fasten the pressure plate 138a at a predetermined position, and the inner end face of the gasket 137, more particularly the inner end face of the inner gasket part 137a comes into tight contact with and is fastened to the pressure plate 138*a*. Moreover it is desirable that the pressure plate 138*a* is fastened not to be rotatable within the enclosure 131. For this purpose, an anchoring key (not shown) may be provided on the outer peripheral surface of the pressure plate 138*a*. The anchoring key may protrude from the outer peripheral surface of the pressure plate 138*a*, and an anchoring groove (not shown) corresponding to the anchoring key may be formed on the inner peripheral surface of the enclosure 131 to be engaged with the anchoring key. Consequently, the pressure plate 138*a* can be secured not to be rotatable within the enclosure 131.

Plural passages 137*f* are formed on the inner gasket part 137*a*. The passages 137*f* are positioned on the inner end face of the inner gasket part 137*a* to surround the through-holes 137*c*, respectively, and extend from the inner end face of the inner gasket part 137*a* through the pressure plate 138*a*. Consequently, the outer gasket part 137*b* is also fastened to the inner gasket part 137*a* through the protrusions or the like not to be rotatable in relation to the enclosure 131.

Figure 5:
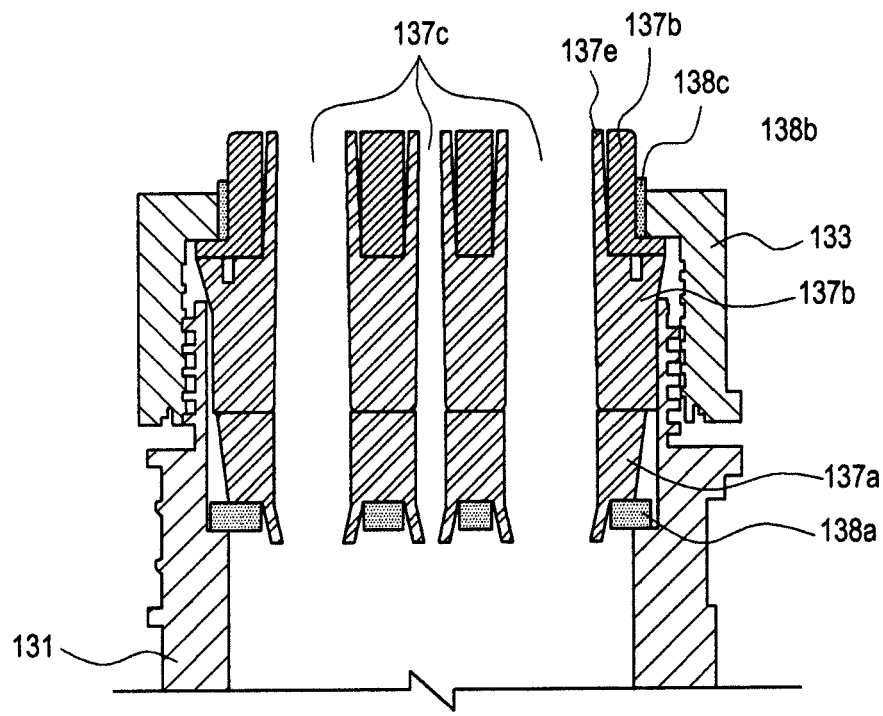
FIG. 5 is a cross-sectional view of a part of the enclosure shown in FIG. 2.

As described above, as the cover 133 is thread-coupled to the enclosure 131 in the state in which the inner gasket part 137*a* and the outer gasket part 137*b* are arranged as described above, a force is exerted by the cover 133 and the outer gasket part 137*b* is pressed to come into close contact with, and press against the inner gasket part 137*a*. At this time, the gasket 137, i.e. the inner gasket part 137*a* and the outer gasket part 137*b* are formed from an elastic resin, such as rubber, silicon or polyurethane, so that the inner and outer gasket parts 137*a* and 137*b* are deformed by the force exerted upon them such that they are pressed into tight contact with the outer peripheral surface of each of the branched-out cables simultaneously while also coming into tight contact with the inner peripheral surface of the enclosure 131, thereby sealing the other end of the enclosure 131. In particular, if the outer gasket part 137*b* has a tapered shape, the diameter of which is gradually increased as approaching to its outer end face as shown in FIG. 5, the outer peripheral surface of the outer gasket part 137*b* will be more tightly in contact with the inner peripheral surface of the enclosure 131 when the cover 131 is thread-coupled to the enclosure 131.

Meanwhile, if the cover 133 is formed from a metallic or synthetic resin material, and the gasket 137, more particularly the outer gasket part 137*b* is formed from an elastic resin, considerable friction occurs to prevent the smooth thread-coupling of the cover 133. In order to avoid this problem, the branching device 103 may include a guide member 138*b*. The guide member 138*b* has one end which is arranged to protrude and extend through the cover 133 while being interferentially supported by the interior of the cover 133 around its outer perimeter. The guide member 138*b* may preferably be fabricated from a lubricative material, such as a polyoxymethylene (POM) or polyacetal, so that the cover 133 can be smoothly rotated when it is thread-coupled in order to secure the cover 133 to the enclosure 131.

When the guide member 138*b* is arranged as described above, a sealing member, such as a washer or for example an O-ring 138*c* is also preferably arranged between the cover 133 and the guide member 138*b* to prevent the permeation of dust and water. The O-ring 138*c* is interposed between the outer peripheral surface of the guide member 138*b* and the inner peripheral surface of the cover 133, wherein the O-ring is preferably formed from an elastic resin, such as silicon and polyurethane.

Meanwhile, the outer end face of the gasket 137, more particularly the outer end face of the outer gasket part 137*b* is formed with guides 137*e*. The guides 137*e* are formed on the outer end face of the outer gasket part 137*b* to surround the through-holes, respectively, and extend from the outer end face of the outer gasket part 137*b* through the guide holes 138*d* formed on the guide member 138*b*, respectively. Accordingly, the through-holes 137*c* are exposed to the outside through the cover 133.

The pressure plate 138*a*, the inner and outer gasket parts 137*a* and 137*b*, and the guide member 138*b* are sequentially coupled to the enclosure 131, and when the cover 133 is thread-coupled to the enclosure 131, the cover 133 exerts a force upon the guide member 138*b* and the guide member 138*b* is compressed. Accordingly, the outer gasket part 137*b* is also compressed through the guide member 138*b* to come into close contact with, and press against the inner gasket part 137*a*.

Each cable branched out from the hybrid fan-out cable 101 is drawn out to the outside of the enclosure 131, more particularly to the outside of the cover 133 through one of the through-holes 137*c*. At this time, the cables drawn out through the through-holes 137*c* are sealed on the outer peripheral surfaces thereof over a sufficient length from the passages 137*f* to the guides 137*e* via the through-holes 137*c*. In addition, as described above, sufficient sealing structures are formed between the enclosure 131 and the outer gasket 137*b*, and between the guide member 138*b* and the cover 138*c* to completely seal the other end of the enclosure 131.

Figure 6:
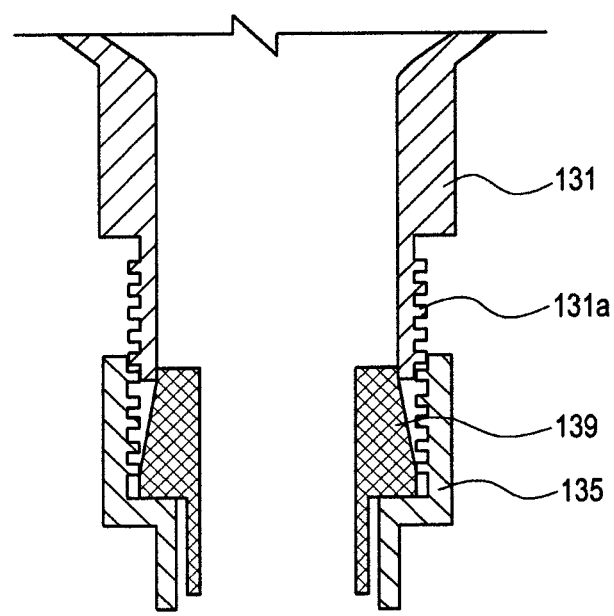
FIG. 6 is a cross-sectional view of another part of the enclosure shown in FIG. 2.

Additionally, the cap 135 and the bushing 139 are provided in order to form a sealing structure in the one end of the enclosure 131 as well. As shown in FIG. 6, the cap 135 is thread-coupled to the threads 131*a* formed on the one end of the enclosure 131, and the bushing 139 is interposed between the enclosure 131 and the cap 135. The bushing 139 is formed from an elastic resin, such as silicon or polyurethane, and as the cap 135 is thread-coupled to the enclosure 131, thus exerting a force to compress bushing 139, the inner peripheral surface of the bushing 139 is slightly deformed and comes into tight contact with the outer peripheral surface of the hybrid fan-out cable 101. Also, the outer peripheral surface of the bushing 139 has an outer diameter dimension that causes the outer peripheral surface of the bushing 139 to come into tight contact with the inner peripheral surface of the enclosure 131. That is, the hybrid fan-out cable 101 is inserted into the enclosure 131 through an opening in the bushing 139. Moreover, as shown in FIG. 9, the bushing 139 has a tapered shape, the diameter of which is gradually increased as approaching to its outer end. Therefore, as the cap 135 is thread-coupled to the one end of the enclosure 131, the bushing 139 is forced into the enclosure 131 so that the outer peripheral surface of the bushing 139 is more tightly in contact with the inner peripheral surface of the enclosure 131. Optionally, in order to reduce the frictional force between the cap 135 and the bushing 139, a separate guide member (not shown) formed from a lubricative resin and similar to the above-mentioned guide member 138*b* may be provided between the cap 135 and the bushing 139. When the separate guide member is provided between the cap 135 and the bushing 139, it will be more desirable to arrange a mechanical seal such as a washer or an O-ring between the separately provided guide member and the cap 135 similar to the above mentioned guide member 138*c*.

Because the inventive branching device configured as described above has an enclosure provided to wrap a branched-out part of a hybrid fan-out cable which is branched out and can be utilized in an indoor/outdoor environment, in particular in an outdoor environment, the branching device can prevent the branched-out part from being contaminated due to dust, moisture or excrement of birds. Furthermore, because the gasket and the other components provided at the opposite ends of the enclosure provide a sealing function as well as allow branched-out cables to be easily drawn out, it is possible to prevent the branched-out part from being damaged by blocking the permeation of dust and water into the branched-out part from the outside.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A branching device for enclosing a hybrid fan-out cable, the hybrid fan-out cable comprising plural optical cables and power cables, the branching device comprising:
   an enclosure having a first end through which the hybrid fan-out cable is inserted and a second end that is opened;
   a gasket provided at the second end of the enclosure and having a plurality of through-holes;
   a cap thread-coupled to said first end of the enclosure;
   a bushing interposed between the cap and said first end of the enclosure; and
   a cover thread-coupled to the second end of the enclosure to fasten the gasket to the second end of the enclosure in such a manner that the through-holes are exposed,
   wherein within the enclosure, the hybrid fan-out cable is branched out into plural individual sub-part cable components, and each of said sub-part cable components is drawn out through one of the through-holes of the gasket to the outside,
   wherein the gasket is formed from an elastic material which forms a tight seal between an inner peripheral surface of the enclosure and with an outer peripheral surface of each of said plural individual sub-part cable components to seal the second end of the enclosure, and
   wherein the bushing comes into tight contact with the inner peripheral surface of the enclosure and the outer peripheral surface of the hybrid fan-out cable to seal said first end of the enclosure.

2. The branching device as claimed in claim 1, wherein said sub-part cable components are comprised of optical/power cables.

3. The branching device as claimed in claim 1, wherein said sub-part cable components are comprised of plural sub hybrid fan out cables, each of which has at least one of the optical cables and at least one of the power cables in combination.

4. The branching device as claimed in claim 1, wherein the gasket comprises an inner gasket part completely received within the enclosure; and an outer gasket part partially received within the enclosure and positioned adjacent to the inner gasket part, the outer gasket part being compressed by the cover to come into close contact with the inner gasket part as the cover is thread-coupled to the enclosure.

5. The branching device as claimed in claim 4, wherein the outer peripheral surface of the outer gasket part comes into close contact with the inner peripheral surface of the enclosure when the outer gasket part is compressed.

6. The branching device as claimed in claim 1, further comprising:
   a pressure plate secured within the inside of the enclosure and being in tight contact with an inner end face of the gasket received within the enclosure; and
   plural passages formed on the inner end face of the gasket to surround each of said plurality of through-holes, respectively, and extending from the inner end face of the gasket.

7. The branching device as claimed in claim 1, further comprising:
   a guide member interposed between the gasket and the cover;
   plural guide holes formed through the guide member; and
   plural guides formed on an outer end face of the gasket to surround each of said plurality of through-holes respectively, and extending from the outer end face, each of the guides being arranged to extend through one of the guide-holes.

8. The branching device as claimed in claim 7, further comprising an seal arranged between the guide member and the cover.

9. The branching device as claimed in claim 8, wherein the seal is interposed concentrically around the guide member and between the outer peripheral surface of the guide member and the inner peripheral surface of the cover.

10. The branching device as claimed in claim 7, wherein a part of the guide member extends beyond said second end of said enclosure and is interfered with by the cover as the cover is thread-coupled to the enclosure, so that the cover exerts a force on the guide member and compresses the gasket.

11. The branching device as claimed in claim 1, wherein said bushing has an opening for receiving said hybrid fan-out cable and wherein the bushing is formed from an elastic resin and has an outer diameter dimension.

12. The branching device as claimed in claim 11, wherein the bushing has a tapered shape, the diameter of which is gradually increased as approaching to its outer end from its inner end.

13. The branching device as claimed in claim 12, wherein the tapered shape of said bushing causes the outer peripheral surface of the bushing to come into tight contact with enclosure as the cap is thread-coupled to the said first end of the enclosure.

14. The branching device as claimed in claim 6, wherein said pressure plate is supported within said enclosure at a predetermined position.

15. The branching device as claimed in claim 6, wherein said pressure plate further includes apertures wherein each of said passages are arranged to extend through one of said apertures.

16. The branching device as claimed in claim 4, wherein said outer gasket has a tapered shape, the diameter of which is gradually increased as approaching to its outer end from its inner end.

17. The branching device as claimed in claim 16, wherein the tapered shape of said outer gasket causes the outer peripheral surface of the outer gasket to come into tight contact with the inner peripheral surface of said enclosure as the cover is thread-coupled to the said second end of the enclosure.

18. The branching device as claimed in claim 8, wherein the seal is an o-ring.

19. The branching device as claimed in claim 8, wherein the seal is a washer.

20. The branching device as claimed in claim 15, wherein said pressure plate passages maintain said apertures in rotational alignment with said plurality of through-holes of said gasket.

* * * * *

UNITED STATES PATENT AND TRADEMARK OFFICE
CERTIFICATE OF CORRECTION

| | | |
|---|---|---|
| PATENT NO. | : 8,938,143 B2 | Page 1 of 1 |
| APPLICATION NO. | : 13/669675 | |
| DATED | : January 20, 2015 | |
| INVENTOR(S) | : Do et al. | |

It is certified that error appears in the above-identified patent and that said Letters Patent is hereby corrected as shown below:

In the claims

Column 7, Claim 3, Line 46 should read as follows:
--...fan-out cables, each...--

Column 8, Claim 7, Lines 11-12 should read as follows:
--...of through-holes, respectively, and...--

Column 8, Claim 8, Line 16 should read as follows:
--...comprising a seal arranged...--

Signed and Sealed this
Twenty-eighth Day of April, 2015

Michelle K. Lee
*Director of the United States Patent and Trademark Office*